Feb. 18, 1964  K. F. CANNON, JR  3,121,239
MARKER BUOY RELEASE MECHANISM
Filed Nov. 16, 1962
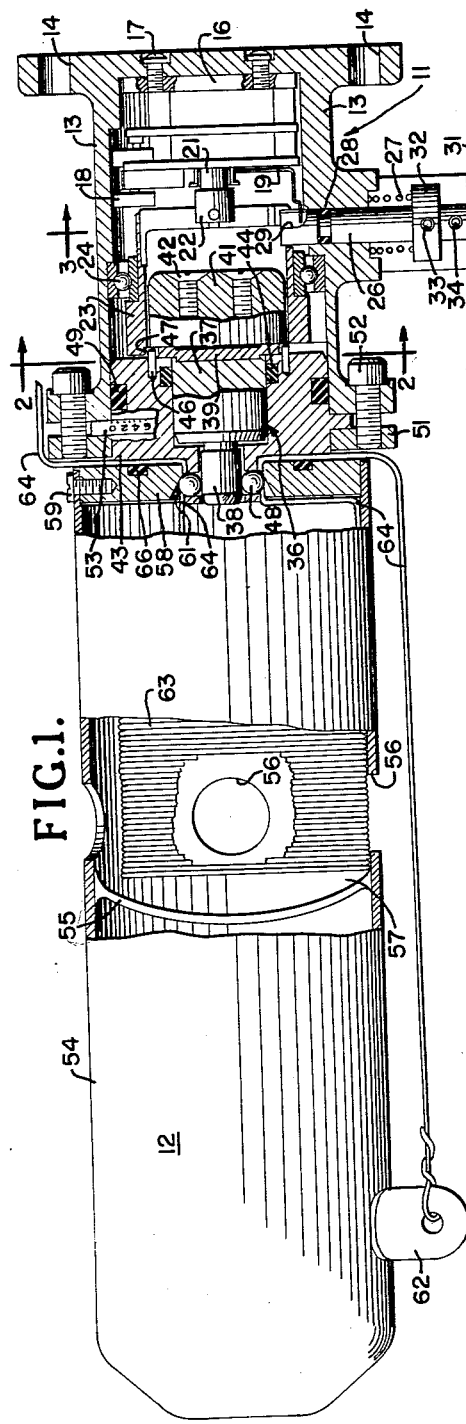
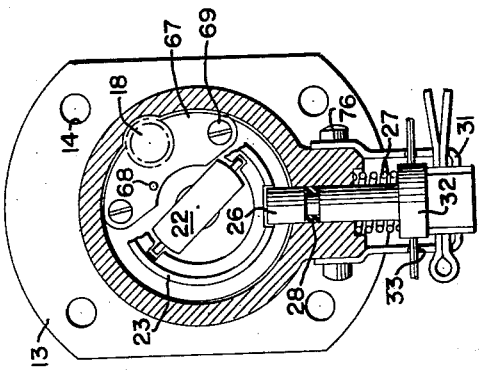
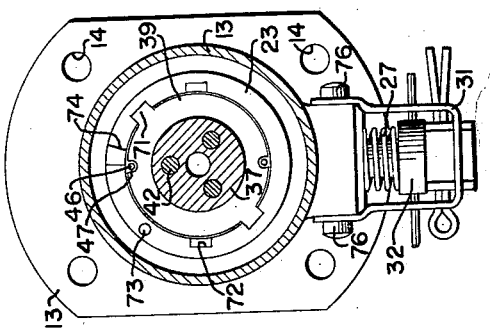
INVENTOR.
KENNETH F. CANNON, JR.

3,121,239
MARKER BUOY RELEASE MECHANISM
Kenneth F. Cannon, Jr., Bethesda, Md., assignor to the United States of America as represented by the Secretary of the Navy
Filed Nov. 16, 1962, Ser. No. 238,308
9 Claims. (Cl. 9—9)
(Granted under Title 35, U.S. Code (1952), sec. 266)

The invention described herein may be manufactured and used by or for the Government of the United States of America for governmental purposes without the payment of any royalties thereon or therefor.

The present invention relates to marker buoys and more particularly to a release mechanism utilized in conjunction with the buoy to effect separation of the release mechanism from the buoy after certain predetermined conditions have been satisfied.

In the field of marker buoys, it has been the general practice to employ a release mechanism which is actuated by water dissolving a soluble substance to release the buoy after the object has been submerged in water for a period of time. Although these have worked well one disadvantage is that it is necessary in these devices to construct the buoy of a heavy material to withstand the water pressure encountered at the depths at which the buoy is released and a second disadvantage is the requirement of having an observer, or a plurality of observers by triangulation, observe the entry point of the object in the water and wait a certain length of time to determine whether the buoy is going to release and surface.

The general purpose of the present invention is to provide a marker buoy which is adapted to be utilized with an object dropped from an airplane, or an aircraft, into a body of water and subsequently be recovered from the body of water. The present invention accomplishes this purpose by providing a release mechanism which is positively blocked against release while it is in the aircraft and in which the release mechanism is initiated upon release from the aircraft, and after a predetermined time and while in flight to the body of water, the release actuating mechanism is positioned to enable the release to be accomplished upon impact with the water, thereby allowing the buoy to remain at the top of the water while at the same time not impeding the trajectory of the object while in air or in water.

An object of the present invention is to provide a marker buoy which is automatically released for recovering a submerged body under water.

Another object of the present invention is to provide a release mechanism for a marker buoy which is activated upon impact with a body of water.

A further object of the present invention is to provide a marker buoy which is capable of being activated by hydrostatic pressure acting upon a release mechanism.

A still further object of the present invention is to provide a release mechanism for a marker buoy which begins its release cycle upon separation from an aircraft and which accomplishes complete release upon impact with a body of water.

And another object is to provide a release mechanism which is locked in the retaining position within the aircraft, and upon departure from the aircraft a timing cycle is initiated which, after a predetermined length of time, unlocks the release mechanism to accomplish release of a marker buoy by either impact upon a body of water or by action of hydrostatic pressure acting upon the release mechanism.

With these and other objects in view, as will hereinafter more fully appear, and which will be more particularly pointed out in the appended claims, reference is now made to the following description taken in connection with the accompanying drawings in which:

FIG. 1 is a side view, partially in section, of an embodiment of the invention showing the release mechanism and the marker buoy;

FIG. 2 is a cross-sectional view taken along the line 2—2 of FIG. 1; and

FIG. 3 is a cross-sectional view taken along the line 3—3 of FIG. 1.

FIG. 1 illustrates generally a release mechanism 11 and a buoy 12 connected together in the attached position. The release mechanism 11 has a housing 13 which is sealed to water entry at all of its apertures and which contains the working components of the release mechanism. At one end of the housing 13 is a plurality of holes 14 for screws to attach the release mechanism to the object which is to be submerged in the body of water. An example of such a body (not shown) is a projectile having fins in which case the housing could be suitably attached to a fin, or the rearward portion of the projectile, or, as another example, the release mechanism could be attached to an aircraft flying over a body of water for release in case of downing into the water. Within the housing 13 is a timing unit 16 which is of the standard spring wound type. The timing unit is held in place by screws 17 which can be sealed by suitable sealing means if the face of the housing 13 is exposed to the water. The timing unit 16 has a shaft with a winding gear 18 attached thereto provided for winding the main spring of the timing unit 16. The timing unit 16 also has an actuating rod or lever 19 attached thereto and controlled by the release mechanism, as will be described later, whose purpose is to initiate the timing action of the timing unit. The timing unit produces rotation of an output shaft 21 to which is attached a connecting bar 22 which connects to and drives a cylindrical cup-shaped release locking device 23. The release locking device is attached to the side walls of the housing 13 and guided within the housing by bearings 24 which are of the ball type.

A safety plunger 26, mounted in the housing 13, has an annular ring 32 thereon, with a spring 27 compressed between the annular ring and the housing to normally urge the safety plunger 26 into a release position (position shown is a locking position). The plunger 26 is suitably sealed to the housing 13 by an O ring 28, which is one of the seals sealing the housing 13 to the outside surrounding medium. In the locking position, as shown in FIG. 1, the safety plunger 26 enters a cutout in the release locking device 23 to prevent rotation thereof, while at the same time a cutout 29 of plunger 26 maintains the actuating rod 19 of the timing unit 16 in a cocked position so that, upon release of the safety plunger 26, the actuating rod initiates the timing unit 16 as well as freeing the release locking device 23 to permit rotation thereof. A retainer 31 covering the plunger 26 co-acts with the annular ring 32 to restrain the safety plunger when in the released position. Two holes 33 and 34 are provided in the safety plunger 26, one in the annular ring 32, and the other within the plunger itself, respectively, with the hole 33 being for the purpose of inserting a safety wire while the mechanism is in the aircraft just prior to release, so that upon release from the aircraft the wire is removed from the hole allowing the plunger to assume the release position. The other hole 34 is normally filled with a cotter pin (FIG. 3) to maintain the safety plunger in the locked position and upon insertion of the safety wire, in the other hole 33, the cotter pin is removed therefrom. The release device shown generally as 36 is formed of a piston 37, a shaft 38, a plate 39, and a weight 41, the shaft and the piston being a unit of the same material, with the weight and the plate being secured thereto by suitable screws 42.

The piston 37 is sealed to a rotatable top 43 by a suitable O ring 44, to maintain the seal of the housing 13. The rotatable top 43 has a pair of pins 46 inserted therein which engage slots 47, in the plate 39, for the purpose of maintaining a reference position for the release device with respect to the release locking device 23. The shaft 38, of the release device 36, protrudes into the neck of the rotatable top 43 and therein engages a plurality of balls 48, and when in the position shown in FIG. 1, maintains the balls in a position which extends beyond the neck of the rotatable top 43 to produce one portion of the locking device. The weight 41 is made of a high density metal and slidably fits within the cup-shaped release locking device 23 to supply by the force of inertia the momentum necessary to drive the release device 36 into the release locking device 23 upon impact with the body of water. Sealing the rotatable top 43 to the housing 13 is a suitable O ring 49, and maintaining the rotatable top 43 in position is a retaining ring 51, secured in place by suitable screws 52, which allows the rotatable top 43 to be rotated so that the desired predetermined period of time may be set by means of the time marks 53.

Also shown in FIG. 1 is the buoy portion of the recovery apparatus. The buoy section comprises one end which is hollow, closed, sealed and generally cylindrical portion 54 to provide the buoyant force to float the buoy portion 12. The other end of the buoy portion is a hollow, generally cylindrical portion having a plurality of holes 56 in the side thereof and closed at one end by a wall 55 separating the one end 54 from the other open end 57. A mounting plate 58 is on the other end of the open end portion 57 and is connected to the cylindrical side walls by screws 59. The plate 58 has, in the center thereof, a hole having a tapered side wall 61 with the smaller diameter of the hole being on the outside face. The mounting plate 58, with the tapered side wall 61, engages the balls 48 protruding from the neck of the rotatable top 43 to maintain the buoy portion positively locked to the release mechanism 11. A bracket 62, with a hole therethrough to which is attached one end of a light weight recovery line 64, is mounted on the side of the buoy portion with the recovery line extending down past the mounting plate 58, into the hole defined by the tapered side walls 61 to form one end of the universally wound lead line 63 placed within the section 57 of the buoy portion. The other end of the lead line extends from the center of the universally wound lead line 63 out through the hole defined by the tapered side wall 61 and is tied to the missile or object, to which the mounting plate 13 is attached. An O ring 66, placed between the mounting plate 58 and the rotatable top 43, performs no sealing action, but is placed there to keep the lead line in place and to prevent undue movement between the buoy section and the release mechanism.

FIG. 2 illustrates the housing 13, the spring 27, the safety wire hole 33, the annular ring 32, the retainer 31, as described in relationship to FIG. 1 and FIG. 3. FIG. 2 illustrates the relationship between the release locking device 23 and the plate 39 of the release device 36, FIG. 1, and more clearly shows the pins 46, also shown in FIG. 1, engaged in the slots 47 of the plate 39. Protruding flaps 71, of the plate 39, are shown in their normal line engaging or locking position with respect to slots 72, which are machined into the side walls of the release locking device 23. Stopping pin 73, which is inserted into the rotatable top 43, is to be engaged with a stopping lug 74 which protrudes from the rotatable release device 23. The position of the parts as shown in FIG. 2 is that of the locking position as illustrated in FIG. 1 and FIG. 3 so that upon release of the safety plunger 26 and in the initiation of the timing unit 16 of FIG. 1 the release locking device 23 will rotate in a counter-clockwise direction, powered by the timing unit for a predetermined span of time as determined by the position of the rotatable top 43, until the stopping lug 74 engages the stopping pin 73, which will terminate any further movement of the release locking device 23, and at this time the protruding flaps 71 of the plate 39 and the slots 72 of the release locking device 23 will be in alignment with each other, so that the release device generally shown as 36 of FIG. 1 will then be able to move into the release locking device 23, as more clearly shown in FIG. 1, and thereby release the balls 48 of FIG. 1. Shown in section is a portion of the piston 37 and also the screws 42. The screws 76 connect and maintain the position of the retainer 31 to the housing 13.

FIG. 3 illustrates the housing 13 with the holes 14 for mounting the release mechanism to an object to be submerged. The winding gear 18 for the timing unit 16 of FIG. 1 is shown, together with a plate 67 attached by screws 69 and containing a pivot hole 68 for guiding a key winder which engages with the winding gear 18 to wind the timing unit. The connecting bar 22 is connected to the release locking device 23 to transmit the rotational movement produced by the timing unit 16 of FIG. 1 to the release locking device 23. The safety plunger 26, together with the O rings 28, the spring 27, the ring 32, and the retainer housing 31 are again shown as described in relationship to FIG. 1. The hole 33 for the safety wire can be seen from FIG. 1 to extend through the annular ring 32 while the hole 34 extends through the outermost portion of the safety plunger 26.

The operation of the automatic separating apparatus for use of marker buoys will now be described. The housing 13 is mounted onto the object to be dropped within the body of water from an aircraft by suitable mounting means, such as screws through the bottom of the plate of the release housing 13. At this time a cotter pin will be inserted in a hole 34 which maintains the safety plunger in a locked position. The safety plunger engages with both the rotatable release locking device 23 as well as the timing unit actuating rod 19. After the unit has been situated in the aircraft, an arming wire is inserted through hole 33, one end of which is attached to the release device and the other end is attached to the aircraft so that upon release from the aircraft of the entire unit the arming wire is removed from the hole. Since the cotter pin in hole 34 has previously been removed while the unit is in the aircraft, the safety plunger 26 is then free to move from the locked position to the release position under the bias of the spring 27. The object to be dropped in the body of water together with release mechanism is now in the air, freed from the aircraft with the safety plunger released so that the timing unit 16 is initiated by the rotation of actuating rod 19 in a clockwise direction as viewed in FIG. 3. The release locking device 23, driven in a counter-clockwise direction by timing unit 16, will rotate a distance in accordance with the predetermined time span set on the rotatable top 43, FIG. 1, until the stopping lug 74 comes in contact with the stopping pin 73 and simultaneously aligning flaps 71 with slots 72. With the releasable locking device 23 in abutment with the stopping pin 73, the release device, shown generally as 36 in FIG. 1, will be free to move into the cup shaped release locking device 23 upon impact with water by the force of inertia. If the span of time set on the timing unit is less than the time of the flight in the air the release device 36 will drop into the release locking device 23 upon impact with water, thereby removing the stem or shaft 38 from the top of rotatable top 43 and allowing the balls 48 to move inwardly to allow the tapered side walls 61 of the mounting plate 58 to pass off of the top of the rotatable top, releasing the buoy to remain on the surface of water. At the same time the lead line 63 is pulled from the center of the mounting plate 58 to maintain a connection between the buoy and the release mechanism together with the object underneath the water.

If the timing unit or span of time set on the timing unit is greater than the time it takes for the unit to drop from the aircraft to the body of water, the release device 36 of FIG. 1 will not be able to move due to the restraining action of the protruding flaps 71 of plate 39 upon the face or shoulder of release locking device 23. Under these conditions the hydrostatic pressure will act upon the shaft 38 of the release device 36 after the device has hit a predetermined depth in the body of water and the release device 36, assuming that the span of time has elapsed, will be forced into the rotatable release locking device 23 thereby allowing separation of the buoy and the release mechanism together with the object. If the span of time set upon the timing unit has not elapsed when the release device has reached the predetermined depth of water at which the hydrostatic pressure is sufficient to effect separation of the marker buoy, the complete unit will continue to descend in the water until the span of time has elapsed thereby aligning flaps 71 with slots 72 to unlock the release device 36 and allowing the hydrostatic pressure to force the release device 36 into the release locking device 23.

The operation of the device is not limited to use on an aircraft if the timing unit is set at the zero time. The unit could be used from a ship and a release device could either be actuated by the hydrostatic pressure of the water acting on the release device 36, as described before, or it also could be utilized as an inertia release as the body hits the body of water if it were dropped from a height sufficient to give it enough momentum to activate the release device 36. In some applications in which the object to which the device of the present invention is attached encounters rather severe vibrations in the flight from the aircraft to the water it is sometimes desirable to place a small screw in the plate 39 of the release device, shown in FIG. 3, so that the screw protrudes over the shoulder of the release locking device 23, nad upon impact with the body of water the screw is sheared before the release device is allowed to be actuated to effect the release as described hereinbefore.

The location of the bracket 62 on the side of the buoy allows the buoy to float more readily on the top surface of the body of the water and in general prevents the buoy from sinking due to the currents present in the body of water.

Various modifications are contemplated and may obviously be resorted to by those skilled in the art without departing from the spirit and scope of the invention, as hereinafter defined by the appended claims, since only an illustrative embodiment thereof has been disclosed.

What is claimed is:

1. An apparatus for automatically releasing a marker buoy from an object to be submerged in a body of water comprising
 a marker buoy having
  a supply of lead line, one end of which is connected to said buoy and the other end is connected to the object to be submerged,
  means for storing said lead line within said buoy,
 a water tight housing having a hollow interior connected to the object to be submerged,
  slidable release means having
   a large mass positioned within the interior of said housing and having a
   shaft connected to the mass, said shaft being normally in communication with the exterior of said housing
  sealing means forming a water tight seal between the shaft and said housing,
  and locking means in simultaneous contact with the shaft and said buoy for maintaining said buoy and said housing joined together as a unit for a period of time until the object to be submerged strikes a body of water causing said release means to slide and break contact with said locking means thereby separating said buoy from the said housing.

2. An automatic release mechanism for separating a marker buoy from an object to be submerged in a body of water comprising
 a floatable apparatus having
  a buoy on one end and a
  container on the other end
  a supply of lead line stored within the container having one end attached to the floatable apparatus and the other end attached to the object to be submerged,
 a release mechanism attached to the object to be submerged and having
  a hollow housing having an aperture formed therein, a weight having a large mass slidably disposed within said housing and having a stem attached to said weight and normally extending through said aperture for communication with the exterior of said housing, sealing means forming a water seal between the stem and the aperture in said housing,
  a locking means in contact with the stem of said weight and releasable in response to the slidable motion of said weight,
  a holding means fixedly attached to said floatable apparatus and in contact within said locking means for maintaining said floatable apparatus coupled to said housing as a unit until release by the movement by the stem of said weight.

3. Apparatus as recited in claim 2 wherein said locking means is
 a plurality of balls and the slidable movement of the stem is actuated by the inertia of said weight when the object hits a body of water.

4. Apparatus as recited in claim 2 wherein said locking means is
 a plurality of balls and the slidable movement of the stem is actuated by the hydrostatic pressure acting upon the stem of the weight.

5. Apparatus as recited in claim 2 wherein said locking means comprises a plurality of balls radially positioned around said stem and held within a plurality of ball receiving apertures formed within said housing, said ball receiving apertures lying in a plane perpendicular to the axis of the stem receiving aperture, and said holding means includes an annular member having a bevelled surface thereon for engagement with said balls.

6. An automatic release apparatus for separating a marker buoy from an object submergible in a body of water comprising
 a marker buoy having
 means to maintain a connection between said buoy and the submergible object;
 a hollow water tight housing having therein
  a timing means for timing a predetermined period of time before actuation of the release apparatus,
  a slidable release means having
   a weight of large mass within said housing and having
   a stem normally communicating with the exterior of said housing, and
  a release locking means connected to and driven by said timing means for restraining the movement of the slidable release means during the predetermined period of time;
  and a buoy locking means in contact with and for maintaining said buoy and said housing as a unit during the predetermined period of time and for a time thereafter until contact with a body of water slides said slidable release means out of contact with said buoy locking means thereby separating said buoy from said housing.

7. Apparatus as recited in claim 6 wherein
 a spring biased plunger normally maintained in the biased position positively engaging said release locking means and said timing unit while the release apparatus is within an aircraft and upon release from the aircraft the plunger disengaging said locking means and initiating the timing means.

8. Apparatus as recited in claim 6 wherein a spring biased plunger normally maintained in the biased position positively engages said release locking means in said timing unit while the release apparatus is within an aircraft, plunger release means for restraining movement of the plunger until said object is dropped from the aircraft, whereby upon release from the aircraft the plunger disengages said locking means and initiates the timing means.

9. An automatic separating apparatus for use with marker buoys comprising a housing having
 means for attaching the housing to an object to be dropped from an aircraft into a body of water and having
 sealed and encased within said housing a rotatable timing means for timing a predetermined span of time,
a release locking means connected to and rotated by said timing means for placing said release locking means in a release position after the span of time,
a safety means connected to said timing means and said release locking means and having a locking position for engaging and thereby preventing rotation of said release locking means and a release position for disengaging said release locking means and for actuating said timing means and biased upon release from the aircraft to move from the locking position to the release position,
and a release means;
and a body having
 one hollow portion sealed to the marker buoy
 and another hollow portion for receiving a universally wound lead line one end of which is attached to said body and the other end of which is attached to the object,
and a plate partially closing one end of the other portion and formed to engage with said release means to normally maintain unity between said body and said housing and to disengage said body and said housing only after the span of time upon impact with the body of water thereby upon separation of said housing and said body the lead line is unwound to maintain contact between said body and said housing.

References Cited in the file of this patent
UNITED STATES PATENTS

| | | |
|---|---|---|
| 1,288,797 | Asbury | Dec. 24, 1918 |
| 2,397,995 | Wikstrom | Apr. 9, 1946 |
| 2,825,803 | Newbrough | Mar. 4, 1958 |

FOREIGN PATENTS

| | | |
|---|---|---|
| 81,829 | Germany | July 8, 1895 |